(No Model.)
R. & T. STOCKDALE.
CHURN.
No. 388,740. Patented Aug. 28, 1888.
Fig 1.
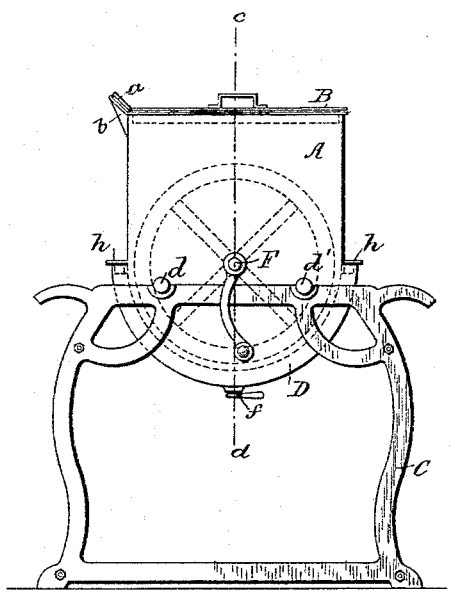
Fig 2.
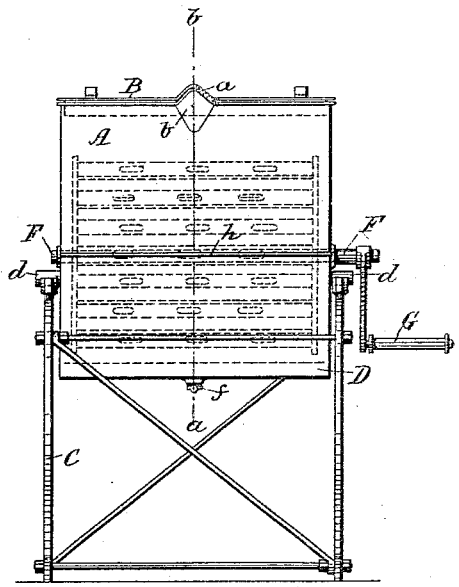
Fig 3.    Fig 5.    Fig 4.
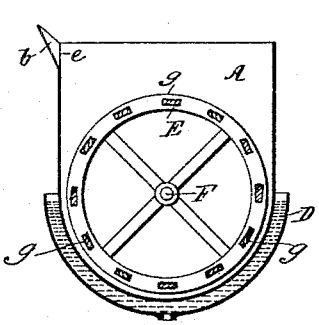 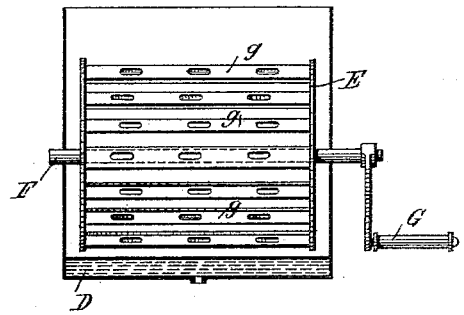
WITNESSES
Charles Bentley
Henry Lill
INVENTORS
Richard Stockdale,
Thomas Stockdale,

UNITED STATES PATENT OFFICE.

RICHARD STOCKDALE, OF HALTON, AND THOMAS STOCKDALE, OF DARWEN, COUNTY OF LANCASTER, ENGLAND.

CHURN.

SPECIFICATION forming part of Letters Patent No. 388,740, dated August 28, 1888.

Application filed May 5, 1888. Serial No. 272,901. (No model.) Patented in England December 11, 1886, No. 16,239.

*To all whom it may concern:*

Be it known that we, RICHARD STOCKDALE, of Halton, and THOMAS STOCKDALE, of Darwen, in the county of Lancaster, England, both subjects of Her Majesty the Queen of Great Britain, have invented a new and useful Improvement in Churns, (for which we have obtained a patent in Great Britain, under date of December 11, 1886, No. 16,239,) of which the following is a specification.

Our invention relates to churns for making butter, its objects being to produce a churn the contents of which, during the process of churning, may be maintained at the desired temperature, and from which they may also be readily removed. To this end we construct the body or main portion of the churn of oblong or other form having a semicircular bottom, which is surrounded by a casing or jacket, into which warm or cold water can be introduced as the temperature of the milk or cream requires raising or lowering. For the purposes of tipping to remove the contents, the body is mounted at each end on two studs supported in the frame-work, while a lip is provided on same for conveniently pouring off the liquid contents.

To clearly explain the nature of our invention, reference is made to the accompanying drawings, in which—

Figure 1 is an end elevation of our improved churn. Fig. 2 is a front elevation of the same. Fig. 3 is a section of the body of the churn through line *a b* of Fig 2. Fig. 4 is a section of the body of the churn through line *c d* of Fig. 1, and Fig. 5 is a detached view of the lip-strainer.

The body of the churn or receptacle A is covered by a close-fitting lid, B, having a hinged flap, *a*, which covers the lip *b*. Around the semicircular bottom is a casing or jacket, D, into which warm or cold water is introduced to raise or lower the temperature of the milk or cream. It has at the bottom an opening, in which is a suitable tap, *f*, for the purpose of drawing off the water, and is closed, if desired, by close-fitting covers, as shown at *h h*, though these are not absolutely essential, as the water may be drawn off by the tap before the vessel is tipped. The receptacle is supported on the frame-work C by means of studs *d d'* at each end of the same, which rest in suitable bearings. In this way when it is desired to remove the contents the body may be tipped forward on the front studs and the liquid contents will pass out through the lip *b*, in front of which a suitable strainer, *e*, as shown in Fig. 5, may be placed. The studs *d* act as pivots when the receptacle is tilted, and serve also to support the receptacle when in normal position. The studs *d'* are provided as bearing-points for the opposite end of the receptacle, and, combined with the studs *d*, sustain the receptacle securely, at the same time allowing the free and easy manipulation of the receptacle when desired. The lid is of course removed to take out the solid contents.

The beater employed consists of a wheel or drum, E, having a series of arms, *g*, Fig. 4, which may be perforated or not, as shown. This is mounted on a horizontal shaft, F, passing through same and being held in suitable bearings on the ends of the receptacle A. A handle, G, is provided for rotating the same.

What we claim, and desire to secure by Letters Patent, is—

In combination, a supporting-frame, C, having bearings, a receptacle, A, having a water-jacket, D, and discharge-opening *e*, said receptacle having also studs *d* and *d'*, arranged at different points on its opposite ends to rest in the bearings upon the frame C, whereby the said receptacle is sustained and allowed to have a tilting movement on the studs, a shaft, F, and a beater carried thereby, substantially as described.

In testimony whereof we have hereunto set our hands in the presence of two subscribing witnesses.

RICHARD STOCKDALE.
THOMAS STOCKDALE.

Witnesses:
CHARLES BENTLEY,
HENRY GILL.